United States Patent Office 3,824,086
Patented July 16, 1974

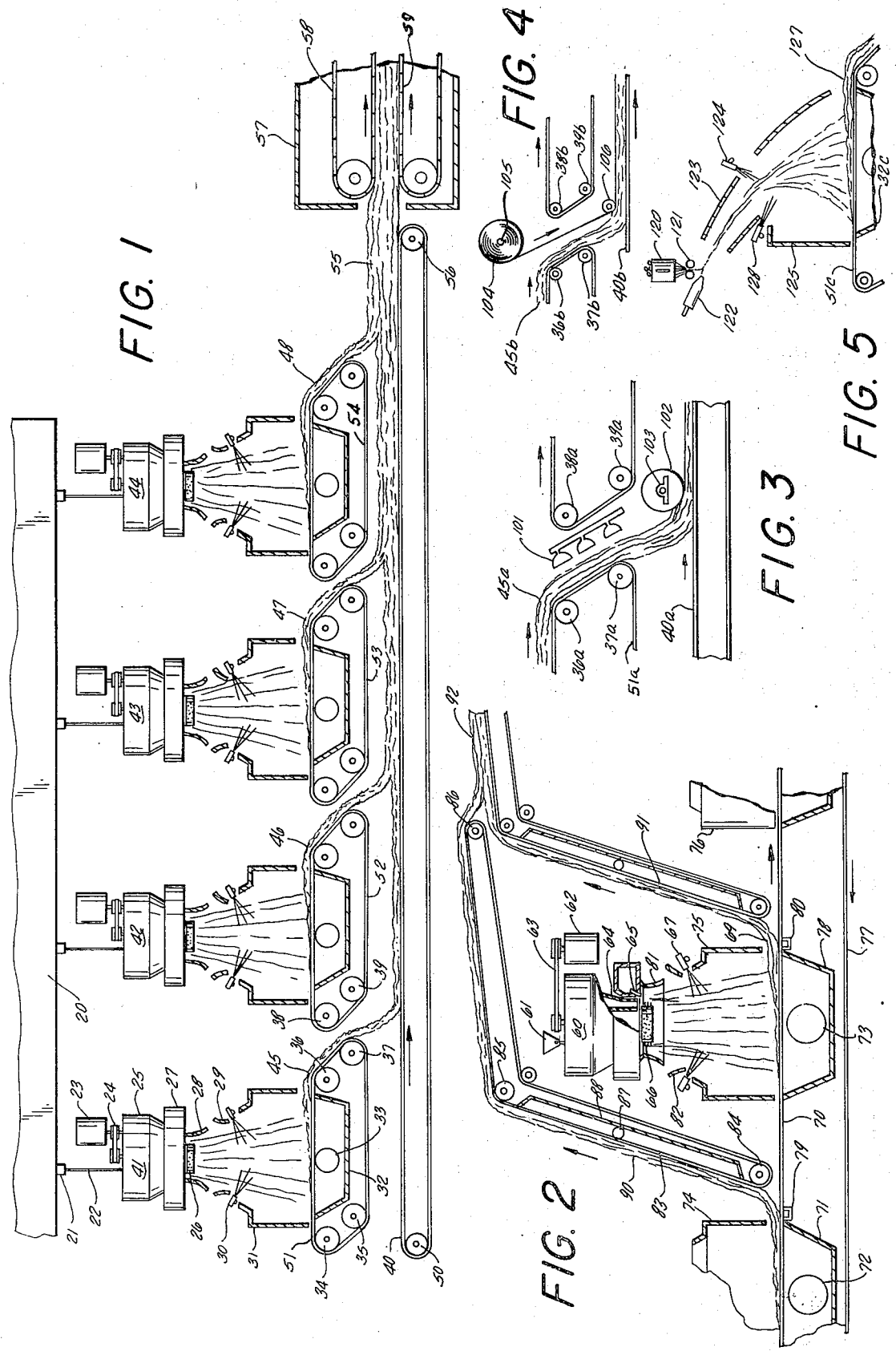

3,824,086
BY-PASS FIBER COLLECTION SYSTEM
Walter Merton Perry and Walter Scott Perry, both of 76 Locust Hill Road, Darien, Conn. 06820
Filed Mar. 2, 1972, Ser. No. 231,345
Int. Cl. C03b 37/04
U.S. Cl. 65—9
9 Claims

ABSTRACT OF THE DISCLOSURE

An improved apparatus for the collection and formation into a blanket of the fine fiber glass fibers produced by a series of glass fiberizing units arranged progressively in line. It is particularly adaptable to the production of glass fibers by the well-known rotary centrifugal process. The fibers are spray coated with thermo-setting resinous binder, and collected on a foraminous conveyor with the assistance of a suction box underneath. In accordance with this invention, means are provided so the output of each individual fiberizing unit may be collected on a clear section of foraminous conveyor, which is free of any previously deposited fibrous blanket, and subject to full vacuum from under the conveyor. This results in improved fiber orientation with most of the fibers lying horizontally in the blanket, and with fewer clumps and porous spots. The individual partial blankets are then continuously combined to form a blanket of full thickness, which is then sized and cured in an oven. The improved system produces a product of greater uniformity and strength, and permits using a lower density to obtain the desired heat flow rating when formed into an insulating blanket. The partial blankets from each fiberizing unit may be formed on separate foraminous conveyors, and then combined prior to feeding into the curing oven, or the individual blanket may be by-passed after collection on a common conveyor, leaving the conveyor open for the next fiberizing unit, and with the separate blankets combined before the oven. Other advantages includes means to partially cure the thin blanket layers individually, increasing the oven capacity, and provision for insertion of laminar material between adjacent layers. The system is also adaptable to other fiberizing methods besides rotary.

BACKGROUND OF THE INVENTION

(1) Field of the Invention

This invention relates to the production of insulation and similar products made from fine fibers formed from heat softenable mineral materials, most generally glass. It relates particularly to the collection of the fine fibers as they issue from the fiber forming units and after they have been spray coated with thermo-setting resinous binder. It relates to the continuous formation of the fibrous material into a mat or blanket, and the conveying of the blanket to the curing oven, where it is sized to thickness and the resin is cured in conventional equipment to produce material of the desired resilience and dimensions.

There are a number of types of fiber forming methods to which this invention applies. The most common form is the rotary or centrifugal system in which a continuous stream of molten mineral material is fed into a rapidly rotating hollow rotor which has multiple orifices in its outer peripheral wall thru which the molten material discharges outwardly by centrifugal force to form filaments, and with means to control the temperatures in the zone immediate to the rotor outer wall, and with additional high velocity gaseous means provided to further attenuate the filaments to substantially decrease their diameters to fine fibers.

The fibers so produced are then generally spray impregnated with a thermo-setting resinous binder and collected on a foraminous conveyor.

A second common fiber forming method is by flame attenuation in which melted glass issues in multiple streams from small orifices in the bottom of a melting pot, the streams are immediately hardened into filaments, which are pulled down continuously by rubber faced mating rolls and are then guide aligned side by side in front of the exit slot of a high velocity flame, and are remelted and formed into fine fibers by the velocity of the blast. Resinous binder is applied to the fibers by sprays, and the fibers collected on a foraminous conveyor. There are numerous other fiber forming systems to which this invention may also be applied.

(2) Description of Prior Art

The collection system most commonly used heretofore for the rotary method of producing fine fibers comprises a number of fiberizing units arranged in series and in line below the glass furnace forehearth, usually with four to six units, and with all the units discharging fibers into the same long common collection chamber. This chamber is positioned above a single foraminous collection conveyor, with a suction box under the conveyor to assist in drawing down the fibers and forming the blanket. Only the fibers from the first fiberizing units in the line fall on a clean open conveyor, where the vacuum under the conveyor can effectively draw the fibers down so they are largely horizontal, which is the preferred position for good insulating value and for strength of the mat. In this system the fibers from each successive unit fall on an already formed fiber layer with its uneven top surface, further exaggerating this unevenness. At the same time the vacuum under the conveyor gradually diminishes as the mat builds up, with less effective fiber flattening power. The result is a porous, uneven blanket with relatively poor insulating quality, and requiring a higher density blanket to meet the product specification of K factor, or specific conductivity.

Another method tried has been arranging the rotary fiberizing units in two rows, side by side, one disadvantage of which is the non-conformity along the overlapping center line. Still another method used for inclined rotary fiberizing units, and for flame attenuation units, is the use of a single row of units arranged side by side and discharging onto a very wide collection conveyor. The main disadvantages of this arrangement are the high cost of the wide conveyor and wide curing oven and the variations in product density and thickness across the width.

Further, the collection and mat forming means used heretofore do not allow any way for smoothing out the layer formed from each individual unit before the next layer is applied. Also there is no opportunity to partially cure a layer or so at a time, while the sheet is relatively thin and easy to cure and easy to free the steam formed from the resin dilution water. Nor is there any way to interleave between the layers with a strength giving lamination or an air or moisture barrier sheet material.

Also, with collection systems used heretofore, the roughest surface is the final top surface of the mat, which usually becomes the outer surface of the finished insulation. As such, porous, or empty areas in the outer surface have no insulating value due to heat transfer by convection.

BRIEF SUMMARY OF THE INVENTION

It is a primary objective of the invention to form a sheet or blanket in which a high percentage of the individual fibers lie horizontally to improve the K factor of the product, and to reduce the voids in the sheet.

Another objective of the invention is to provide a uniform vacuum under the collection conveyor for the output of each fiberizing unit to more effectively draw the fibers down flat, and to draw descending fibers over to fill partially empty spaces on the conveyor as the mat is formed.

Still another objective of the invention is to form the layer of fiber from each succeeding fiberizing unit on a clean flat collection conveyor, rather than on a rough fiber layer, where this roughness would be further exaggerated.

It is another objective of the invention to combine several separately formed blanket layers, one upon the other, to average out any low density spots in any of the blankets, and make a more homogeneous sheet.

Another objective of the invention is to provide collection means to form thicker mats than heretofore possible, and to arrange more fiberizing units in series for greater capacity.

Still another objective of the invention is to provide a collection system suitable for various fiberizing apparatus, such as rotary and flame attenuation, and in which different systems can be combined on one machine to give different desired characteristics to different layers of the blanket.

A further objective of the invention is to partially cure the thermo-setting resin binder, one fiberizing unit mat at a time, to increase curing oven capacity.

Another objective of the invention is to provide means for interleaving laminar material, such as air or moisture impervious sheet, between laminations, for improving the physical properties of the product.

BRIEF DESCRIPTION OF THE DRAWINGS

Other objectives and advantages of the invention will become apparent from the description given in the specifications and by reference to the following drawings:

FIG. 1 is an elevation showing four rotary fiber forming units with individual foraminous collection conveyors for each unit, and a common combining conveyor, forming the subject matter of this invention.

FIG. 2 is an elevation showing in more detail the arrangement of a rotary fiberizing unit, and illustrating an alternative by-passing conveyor arrangement in keeping with this invention.

FIG. 3 is an elevation showing means for partial curing of the resin binder in the individual blanket from one fiberizing unit, and partially compressing the blanket.

FIG. 4 is an elevation showing means for interleaving a laminar sheet between adjacent blanket layers.

FIG. 5 is an elevation illustrating the adaptation of a flame attenuation fiberizing unit to the collection system of this invention.

DESCRIPTION OF THE PREFERRED EMBODIMENTS OF THE INVENTION

The present invention provides improved apparatus for the collection and formation into blankets of fine fibers formed from heat softened mineral materials such as glass. This invention is of particular advantage when used with the rotary, or centrifugal type of fiber forming apparatus, the operating principles of which are well known in the art, and one preferred form of which is described later in connection with FIG. 2. A second well known apparatus for the production of fine fibers is the flame attenuation process which is described in connection with FIG. 5, and to which the improved apparatus of this invention can also be advantageously applied.

Referring now to FIG. 1, we show in the elevation four rotary fiberizing units 41, 42, 43 and 44, arranged in series under the forehearth 20, which is supplied with molten glass from a continuous glass furnace. Unit 41, for example, receives molten glass stream 22 thru forehearth orifice 21. The glass feeds into high speed rotor 26, which is rotated by motor 23 thru belt drive 24. The outer peripheral wall of the rotor contains multiple orifices thru which the molten glass discharges by the pressure of centrifugal force as filaments. Annular burner 25 maintains the temperature at the rotor outer wall, and gaseous header 27 provides an annular gaseous blast of air or steam for attenuating the filaments into fine fibers. Enclosure shrouds 28 and 29 guide the fibers down and a ring of spray guns 30 serves to apply finely atomized phenolic binder solution to the fibers, after which they pass down into enclosure 31 to be collected on foraminous collection conveyor 51, which is driven by and carried on rolls 34, 35, 36 and 37. A suction box 32, connected by pipe 33 to a suction blower, not shown, serves to draw the fibers down and form the sheet 45.

The primary improvement in this invention is to preferably provide each fiberizing unit with its own separate collection conveyor, so the fibers from each unit fall on a clean flat conveyor screen with suction underneath. The thin blanket 45 from unit 41, discharges down to a long combining conveyor 40, supported and driven by end rolls 50 and 56.

Fiberizing unit 42 discharges fibers to form blanket 46 on foraminous conveyor 52, which is supported on rolls 38 and 39 and two at the other end. Blanket 46 is deposited squarely on blanket 45 on conveyor 40. Similarly, unit 43 forms thin blanket 47 on conveyor 53, and unit 44 forms thin blanket 48 on conveyor 54, the four blanket elements combining to form the full thickness at 55.

A curing oven 57, with upper flight conveyor 58 and lower flight conveyor 59, serves to form the sheet to the desired thickness, and to curve the thermo-setting phenolic resin to produce the resilient insulating blanket.

The fiberizing unit 41 was described above in only one form of rotary fiberizing apparatus. The subject invention applies as well to other forms of rotary apparatus in common use and which have variations in the means for heating the rotor wall, the means for heating the zone antiguous to the wall, and the gaseous means for attenuating the filaments of fine fibers. For instance burner 25 may provide high velocity combustion gases for heating the wall of the rotor and also for attenuating the filaments, and with header 27 not required. Or another combination may be used in which burner 25 provides an annular flame for controlling the temperatures at the rotor wall, and header 27 comprises burner means to provide a high velocity annular attenuation gaseous blast of hot products of combustion.

Experience has shown that a density of 0.6 pound per cubic foot is necessary with rotary produced glass fibrous insulation used, for instance, for house insulation in order to obtain the prescribed K factor, or unit conductivity, for this service. A density of only 0.4 pound per cubic foot gives about the same K factor when the fibers are produced by the flame attenuation process. A major objective of this invention is to improve the rotary fiber collection system to lower the density required for a given K factor, to bring it closer for instance, to the 0.4 mentioned above, and make possible substantial lowering of production costs.

In the rotary apparatus the fibers are shortened to a degree by mechanical breaking and they become twisted together due to the rapid revolutions and the very large output of fibers from the rotor. As the fibers float down to the collection conveyor they tend to form clumps, and a clumpy blanket with varying densities gives lower insulating values, especially at the low densities, such as 0.4 to 0.6 pound per cubic foot desired for many products. For instance, a denser spot gives only a small increase in heat flow resistance, but a low density spot has substantially lower heat resistance because of the rapid increase in convection heat transfer at very low densities.

When a fiberizing unit discharges onto an open conveyor with high suction underneath, especially if the conveyor is moving fast, the fibers are drawn out and flattened down to a horizontal position, in which position they conduct less heat between the faces of the finished insulation. The clumps are flattened out, and any porous spots filled in. Further, the horizontal fibers result in a stronger sheet in products where tensile strength is needed. This invention permits attaining this desirable condition for each of the fiberizing units, instead of just the first unit in the line as heretofore.

FIG. 2 shows an alternative way to by-pass the individual blankets, in this case over the top of the fiberizing units. A common foraminous collection conveyor 70 passes under each fiberizing unit. The initial thin blanket 90 is formed on 70 in housing 74 assisted by suction box 71, which has blower connection 72. An air lance 79 serves to loosen the blanket from conveyor 70 and it then passes upward on conveyor 83, which is mounted on rolls 84, 85 and 86. A suction box 88, with suction blower connection 87, serves to prevent the mat from sliding back on the conveyor. This mat 90 is deposited on top of mat 69 coming from unit 60 to form composite blanket 92.

With this construction, the fiberizing units must be positioned off to one side of the forehearth, and the glass stream brought over in electrically heated trough 61. Rotor 66 is rotated by motor 62 thru belt drive 63. Annular gas burner 64 heats the initial attenuation zone adjacent to the rotor perforated outer wall, and annular ring of gaseous blast nozzles 65 provide the high velocity air to attenuate the filaments to fine fibers. Annular shrouds 81 and 82 carry the fibers past ring of atomizing binder nozzles 67. The sheet is formed in housing 75 on conveyor 70, with the help of suction box 78, with blower connection 73. The return travel of conveyor 70 is shown at 77.

The blanket of fiberizing unit 60 is formed on conveyor 70 with the mesh fully open because mat 90 has been by-passed, and the sheet formation is thereby improved for better insulating value. The sheet is freed by air lance 80, and carried up on conveyor 91, which in turn deposits combined blanket 92 on a similar by-pass conveyor from the next unit corresponding to housing 76. The final complete composite blanket is brought down on an inclined conveyor and carried into the entrance of the curing oven.

A major advantage accruing from use of the by-pass system is illustrated in FIG. 3. Blanket 45a is carried on conveyor 51a, supported on rolls 36a and 37a, down to conveyor 40a. Radiant heaters 101 serve to dry and and partially cure the top surface of the blanket so it can be pressed by roll 102 supported on shaft 103. Roll 102 is preferably a heated copper or aluminum roll which serves to partially cure the upper surface of the blanket. If such a roll is used on each individual blanket, there are two advantages. The individual sheets are made smoother and flatter, ending in a more uniform blanket. More important, the partial cure obtained thru the inaccessible inner regions of the final full thickness blanket greatly reduces the load on the curing oven, the length of which can be thereby reduced. The partial cure vents resin dilution moisture from the sheet, so the blanket reaches curing temperature faster in the oven.

FIG. 4 shows another advantageous arrangement. Blanket 45b is carried down to combining conveyor 40b, and a supply roll of sheet material 104, carried on shaft 105, feeds on top of 45b, guided by roller 106. This interleaving material can serve numerous purposes, such as increased strength and stiffness of the blanket, greater fire resistance, greater resistance to passage of moist air, etc.

FIG. 5 shows a conventional flame attenuation fiberizing unit arranged for adaptation to the system of this invention. Marbles are melted in electrically resistance heated bushing 120, with glass filaments discharging from orifices in the bottom of the bushing, and drawn down by rubber faced pulling rolls 121, and aligned in front of burner 122. The high temperature, high velocity blast from the burner re-melts and attenuates the filaments into fine fibers. The fibers are guided by member 123, phenolic binder is applied by spray guns 124 and 128, and blanket 127 is formed on foraminous conveyor 51c in housing 125 with the help of the suction box 32c under the conveyor.

Conveyor 51c may be a separate individual conveyor as shown in FIG. 5, and which is similar to conveyor 51 in FIG. 1, or it may be part of a common conveyor as at 70 in FIG. 2, and with a by-pass conveyor such as 83 to take away the previously formed blanket before the fiberizing unit at 125 is reached.

Still another arrangement for by-passing the blanket from each fiberizing unit when the same foraminous collection conveyor is used for all, as in FIG. 2, is to convey each blanket off to one side, between adjacent housings, and collect one on top of the other on a parallel side positioned combining conveyor. This distorts the sheet, however, and is a less desirable arrangement.

The flame attenuation fibers tend to be longer and finer than the rotary fibers, and for this reason it is desirable for some products to combine the two systems, using the flame attenuation fibers, for instance, on the outer side of the blanket to give a smoother surface finish.

In any installation the number of by-passes can be limited. For instance if there are six rotary units in line, the units can be arranged in pairs, with two to a housing and collection conveyor, and the double output then by-passed to the combining conveyor, etc.

In the claims, the gases discharged from the downwardly facing orifice means comprise any gases, such as air, steam, or products of combustion, and the velocity of the gases is sufficient to give the amount of additional attenuation required to reach the desired degree of fiber fineness, and the orifice means comprises means for discharging a single or a plurality of annular gaseous discharges.

It will be apparent that while I have shown and described the invention in several preferred forms, changes may be made without departing from the scope of the invention, as sought to be defined in the following claims.

What we claim is:

1. In an apparatus for processing fine fibers formed from heat softened viscous thermoplastic mineral material, such as glass, said apparatus comprising a plurality of rotary fiberizing units positioned in series and in line, and in which each of said fiberizing units comprises, a hollow rotor, the outer peripheral wall of which has a plurality of superposed filament forming orifices therein, and means for turning said rotor at high speed to effect discharge of said mineral material thru the orifices by centrifugal force to form filaments, means for supplying said softened mineral material to said rotor, heating means to maintain said rotor outer wall and the emerging filaments at temperature close to that of the molten mineral material, annular concentric downwardly facing orifice means positioned radially outward from the outer peripheral wall of said rotor, and having means for discharging gases from said orifice means in a generally downward direction and into engagement with said filaments and to re-direct and further attenuate said filaments to fine fibers, means for impregnating the fibrous mass with binder material, collection conveyor means positioned below said fiberizing unit for collecting said fine fibers, the improvement comprising a section of open foraminous collection conveyor means under each of a plurality of said fiberizing units, said collection conveyor means having means to collect the fine fibers produced by each said fiberizing unit in individual fibrous blanket form, and said plurality of fiberizing units having means for separating the fibrous blanket formed by each unit from any other, and driving means for said collection conveyor means, and combining conveyor means to receive and to combine said individual fibrous blanket forms from said fiberizing units into a thicker fibrous blanket.

2. Apparatus according to claim 1 in which there is a section of open foraminous collection conveyor means under each of said fiberizing units, said collection conveyor means having means to collect the fine fibers produced by each said fiberizing unit in individual fibrous blanket form, and said fiberizing units having means for separating the fibrous blanket of each unit from any other, and driving means for said collection conveyor means, and combining conveyor means to receive and to combine individual fibrous blanket forms from said collection conveyor means into a thicker fibrous blanket.

3. In an apparatus for processing fine fibers formed from heat softened viscous thermoplastic mineral material, such as glass, said apparatus comprising a plurality of rotary fiberizing units positioned in series and in line, and in which each of said fiberizing units comprises,
 a hollow rotor, the outer perpheral wall of which has a plurality of superposed filament forming orifices therein, and means for turning said rotor at high speed to effect discharge of said mineral material thru the orifices by centrifugal force to form filaments,
 means for supplying said softened mineral material to said rotor,
 heating means to maintain said rotor outer wall and the emerging filaments at temperatures close to that of the molten mineral material,
 annular concentric downwardly facing orifice means positioned radially outward from the outer peripheral wall of said rotor, and having means for discharging gases from said orifice means in a generally downward direction and into engagement with said filaments and to re-direct and further attenuate said filaments to fine fibers,
 means for impregnating the fibrous mass with binder material,
 collection conveyor means positioned below said fiberizing unit for collecting said fine fibers,
 the improvement comprising
 a plurality of individual endless foraminous collection conveyor means positioned under a plurality of said fiberizing units in said line, each said endless collection conveyor means comprising a top pass travelling under at least one fiberizing unit to collect the fine fibers produced by said fiberizing unit in fibrous blanket form, and a bottom pass returning to the starting point of said endless conveyor travel, and combining conveyor means positioned at the discharge points of said individual collection conveyor means to receive and to combine the fibrous blankets discharged from said individual collection conveyor means into a thicker fibrous blanket.

4. Apparatus according to claim 3 in which there is an individual endless foraminous collection conveyor means positioned under each of said fiberizing units in said line, each said endless collection conveyor means comprising a top pass travelling under one fiberizing unit to collect the fine fibers produced by said fiberizing unit in fibrous blanket form, and a bottom pass returning to the starting point of said endless conveyor travel, and combining conveyor means positioned at the discharge points of said individual collection conveyor means to receive and to combine the fibrous blankets discharged from said individual collection conveyor means into a thicker fibrous blanket.

5. Apparatus according to claim 3 in which said combining conveyor means has means to combine the fibrous blankets discharged from said individual collection conveyor means into a plurality of thicker fibrous blankets.

6. In an apparatus for processing fine fibers formed from heat softened viscous thermoplastic mineral material, such as glass, said apparatus comprising a plurality of rotary fiberizing units positioned in series and in line, and in which each of said fiberizing units comprises,
 a hollow rotor, the outer peripheral wall of which has a plurality of superposed filament forming orifices therein, and means for turning said rotor at high speed to effect discharge of said mineral material thru the orifices by centrifugal force to form filaments,
 means for supplying said softened mineral material to said rotor,
 heating means to maintain said rotor outer wall and the emerging filaments at temperatures close to that of the molten mineral material,
 annular concentric downwardly facing orfice means positioned radially outward from the outer peripheral wall of said rotor, and having means for discharging gases from said orifice means in a generally downward direction and into engagement with said filaments and to re-direct and further attenuate said filaments to fine fibers,
 means for impregnating the fibrous mass with binder material,
 collection conveyor means positioned below said fiberizing unit for collecting said fine fibers,
 the improvement comprising
 a section of open foraminous collection conveyor means under each of a plurality of said fiberizing units, and which said section is substantially free of a veil of fibrous material formed by a fiberizing unit positioned ahead of said section in said line and combining conveyor means to receive and to combine individual fiberous blanket forms from said collection conveyor means into a thicker fibrous blanket.

7. Apparatus according to claim 6 in which said combining conveyor means extends from the said discharge of said fiberizing unit up and over any subsequent fiberizing unit in said line, and extends further to said combining point means to carry the fibrous blanket formed by said fiberizing unit to combine continuously with the fibrous blankets formed by other fiberizing units in said line to form a thicker fibrous blanket.

8. Apparatus according to claim 6 in which there is a section of open foraminous collection conveyor means under each of said fiberizing units in said line, and which said section is substantially free of a veil of fibrous material formed by a fiberizing unit positioned ahead of said section in said line, and combining conveyor means to receive and to combine individual fibrous blanket forms from said collection conveyor means into a thicker fibrous blanket.

9. Apparatus according to claim 8 in which said combining conveyor means extends from the said discharge of said fiberizing unit up and over any subsequent fiberizing unit in said line, and extends further to said combining point means to carry the fibrous blanket formed by said fiberizing unit to combine continuously with the fibrous blankets formed by other fiberizing units in said line to form a thicker fibrous blanket.

References Cited

UNITED STATES PATENTS

| | | | |
|---|---|---|---|
| 3,377,233 | 4/1968 | Jackson | 65—3 X |
| 3,429,681 | 2/1969 | Krakauer et al. | 65—9 |
| 2,339,431 | 1/1944 | Slayter | 65—9 X |
| 2,450,915 | 10/1948 | Powell | 65—9 X |
| 2,586,774 | 2/1952 | Bastian et al. | 65—9 |
| 2,658,848 | 11/1953 | Labino | 65—9 X |
| 2,897,874 | 8/1959 | Stalego et al. | 65—9 X |
| 3,262,578 | 7/1966 | Dennis | 65—4 X |
| 2,961,698 | 11/1960 | Rea | 65—9 X |

FOREIGN PATENTS

| | | | |
|---|---|---|---|
| 599,084 | 6/1945 | Great Britain | 264—112 |

ROBERT L. LINDSAY, JR., Primary Examiner

U.S. Cl. X.R.

65—11 R, 14; 156—62.8; 264—112

Notice of Adverse Decision in Interference

In Interference No. 98,964, involving Patent No. 3,824,086, W. M. Perry and W. S. Perry, BY-PASS FIBER COLLECTION SYSTEM, final judgment adverse to the patentees was rendered Aug. 24, 1977, as to claims 1–6 and 8.

[*Official Gazette December 20, 1977.*]